United States Patent [19]

Moriyama

[11] Patent Number: 5,042,067
[45] Date of Patent: Aug. 20, 1991

[54] PASSWORD SECURITY METHOD

[75] Inventor: Junichi Moriyama, Kawasaki, Japan

[73] Assignee: Fujitsu Limited, Kawasaki, Japan

[21] Appl. No.: 497,910

[22] Filed: Mar. 23, 1990

[30] Foreign Application Priority Data

Mar. 25, 1989 [JP] Japan ................................. 1-72255

[51] Int. Cl.⁵ .............................................. H04K 1/00
[52] U.S. Cl. ........................................ 380/25; 380/49
[58] Field of Search ................................. 380/25, 49

[56] References Cited

U.S. PATENT DOCUMENTS

| | | | |
|---|---|---|---|
| 4,211,919 | 7/1980 | Ugon | 380/25 |
| 4,256,955 | 3/1981 | Giraud et al. | 380/25 |
| 4,910,773 | 3/1990 | Hazard et al. | 380/25 |
| 4,910,774 | 3/1990 | Barakat | 380/23 |
| 4,926,481 | 5/1990 | Collins, Jr. | 380/25 |
| 4,942,606 | 7/1990 | Kaiser et al. | 380/25 |

FOREIGN PATENT DOCUMENTS 59-32059  2/1984  Japan .
60-39267  3/1985  Japan .
1-152526  6/1989  Japan .

*Primary Examiner*—Thomas H. Tarcza
*Assistant Examiner*—David Cain
*Attorney, Agent, or Firm*—Staas & Halsey

[57] ABSTRACT

Disclosed is a password security method in a man-machine system for keeping the secrecy of a password during a setting process of the system. To keep not only the secret of the password but also the presence of the password from unauthorized users, the method comprises a prompt displaying step for prompting to enter an equipment name and not prompting to enter the password; a password discriminating step to discriminate whether or not a correct password is entered; a step for entering a normal mode when the correct password is not detected; and step for entering a password mode when the correct password is detected.

20 Claims, 7 Drawing Sheets

FLOWCHART OF PRIOR ART
PROCESS SEQUENCES

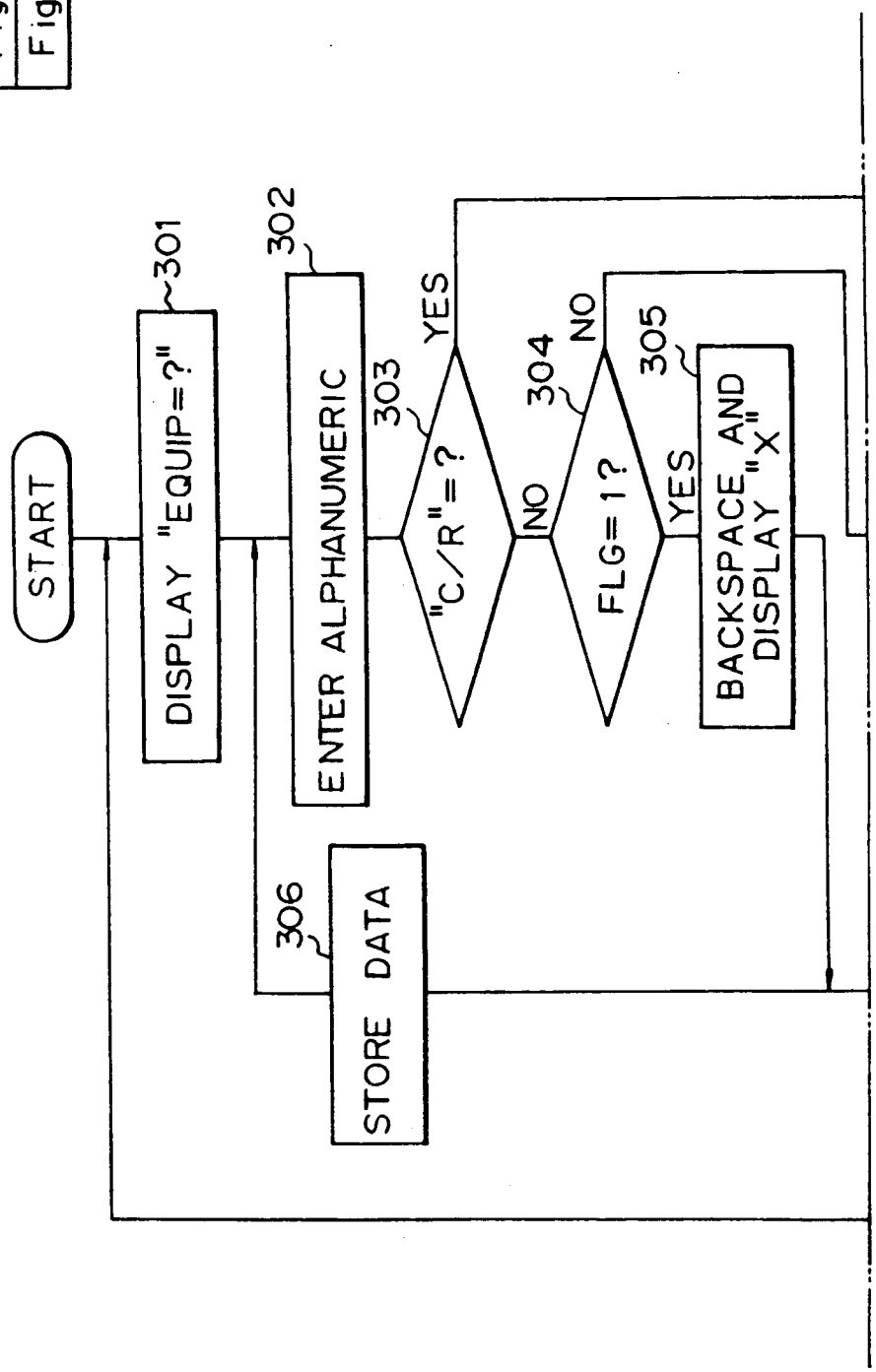

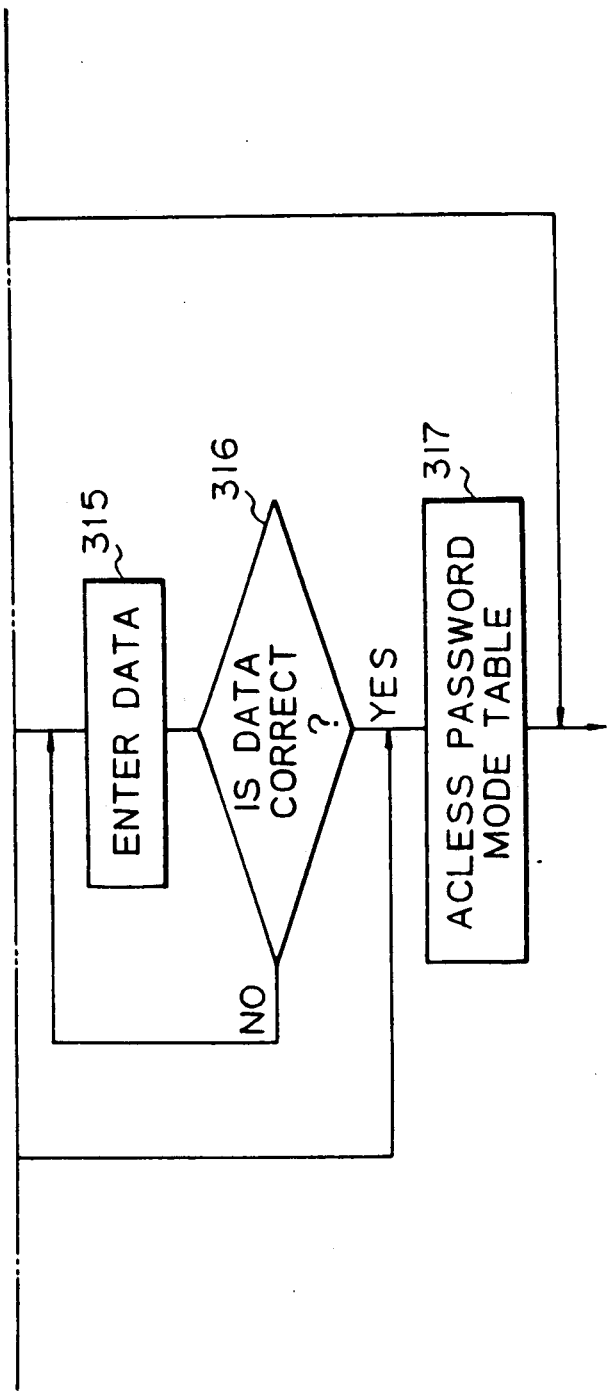

DISPLAY EXAMPLES OF DISPLAY UNIT

NOMAL MODE

*Fig. 4A*

```
1  EQNO=?    C/R
2  EQNO=0
3  EQNO=?    0  C/R
4  DISPL?    Y  C/R
5  DISPL:ALM?
         :
```

PASSWORD MODE

*Fig. 4B*

```
1  EQNO=?    C/R
2  EQNO=0
3  EQNO=?    0-TEST  C/R
4  PASSWORD  OK
5  CHG PASSWORD?  Y  C/R
6  DISPL?    Y  C/R
7  DISPL:ALM?
         :
```

WRONG PASSWORD

*Fig. 4C*

```
1  EQNO=?    C/R
2  EQNO=0
3  EQNO=?    0-TEST  C/R
4  DISPL?    Y  C/R
5  DISPL:ALM?
         :
```

WRONG EQUIPMENT UMBER

*Fig. 4D*

```
1  EQNO=?    C/R
2  EQUIP NO NG!
3  EQNO=0
4  EQUIP NO NG! EQNO=?0 CR
5  EQUIP NO NG!
6  EQNO=1
7  EQNO=?1 CR
8  EQUIP NO NG!
         :
```

PASSWORD SECURITY METHOD

BACKGROUND OF THE INVENTION

1. Field of the Invention

The present invention relates to a method for protecting a password in a man-machine system, and more particularly to a password security method for protecting the password without letting a user perceive the existence of the password.

The password is employed to limit users allowed to achieve a setting operation, etc., of the man-machine system.

It is necessary for the man-machine system to provide a password security system that can secure secrecy of a password of the system to protect the system from access by unauthorized users.

2. Description of the related Art

A cross reference related to the present invention is, for example, Japanese Patent Publication (Kokai) No. 59-32059 laid open to the public on Feb. 21, 1984.

Operating environments of primary and remote communication systems are usually set through software. For example, the communication conditions of certain communication transmitters and the operating conditions of personal computers are usually set through software.

It is necessary to protect important conditions of a system against illegal manipulation, by limiting users who are allowed to set the important conditions. To achieve this, a particular password is introduced, and unless the password is correctly entered by a user into the system, the user is not allowed to set the important conditions of the system.

In the conventional man-machine system, at a time of system start-up, a user is prompted to enter a password by displaying an instruction of, for example, "PLEASE ENTER A PASSWORD". Therefore, the user naturally knows the necessity to enter a password and also knows the timing when a password should be entered.

A password is usually a simple combination of several characters and numerals. Therefore, the necessary password can easily be found by an unauthorized user.

Accordingly, in the conventional system, an unauthorized user can try to enter a password when he is prompted by the system. If the entered password is incorrect, he can again try to enter another password. After such operations are repeated several times, he can finally find the correct password.

SUMMARY OF THE INVENTION

To prevent this, an object of the present invention is to provide a password security system for a man-machine system in which the password is securely protected by not letting a user perceive the existence of the password.

To attain the above object, there is provided, according to the present invention, a password security method for a man-machine system in which, to start a setting process of the man-machine system, a special code, password and return code are sequentially entered into the system. When the password is judged to be correct, a password-required mode is activated, and when the password is judged to be wrong, a password not-required mode is activated.

When the entered data includes no return code and includes the special code, the system displays an other code instead of displaying the entered password.

When the input data includes a return code, the system judges whether or not the entered password is correct, and displays the result of the judgement.

In operation, to start the setting operation of the man-machine system, log-in data is entered into the system. The log-in data may be an equipment number.

Thereafter, a special code such as "—" is entered, and then a password. The special code shall be selected from infrequently used codes. The password to be entered after the special code is displayed with a series of "X" characters or the like.

Then the entered log-in data and password are checked sequentially. If the password has not been entered, a normal mode is enabled. If the password has been entered and if the same is correct, the correctness is displayed to start a password mode. If the password is wrong and if the log-in data is correct, no particular message is displayed but the normal mode is simply started.

In this way, the existence of the password is concealed from a user in the normal mode. Namely, the existence of the password will not be perceived by a user who does not know the password. The present invention, therefore, can surely protect the password.

BRIEF DESCRIPTION OF THE DRAWINGS

The above object and features of the present invention will be more apparent from the following description of the preferred embodiments with reference to the drawings, wherein:

FIG. 3, which includes FIGS. 3A to 3C, is a flowchart showing a password security method according to an embodiment of the present invention;

FIGS. 4A to 4D are diagrams showing display examples on a display unit; and

DESCRIPTION OF THE PREFERRED EMBODIMENTS

Figure 1:
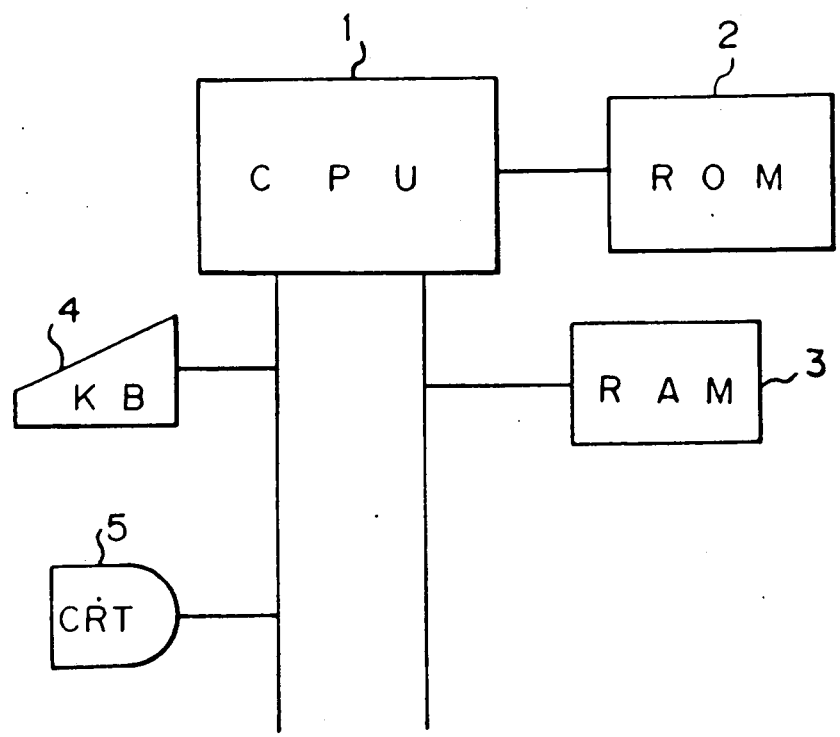
FIG. 1 is a block diagram of a man-machine system to which the present invention is applied.

For better understanding of the present invention, a typical man-machine system to which the present invention is applied will be described with reference to FIG. 1, wherein 1 is a central processing unit (CPU) for processing a system set-up operation including the password security operation; 2 is a read only memory (ROM) for storing a program of the system set-up; 3 is a random access memory (RAM) for storing data; 4 is a keyboard (KB) for entering characters, numerals and others symbols; and 5 is a display unit (CRT) for displaying various prompt inquiries.

Figure 2:
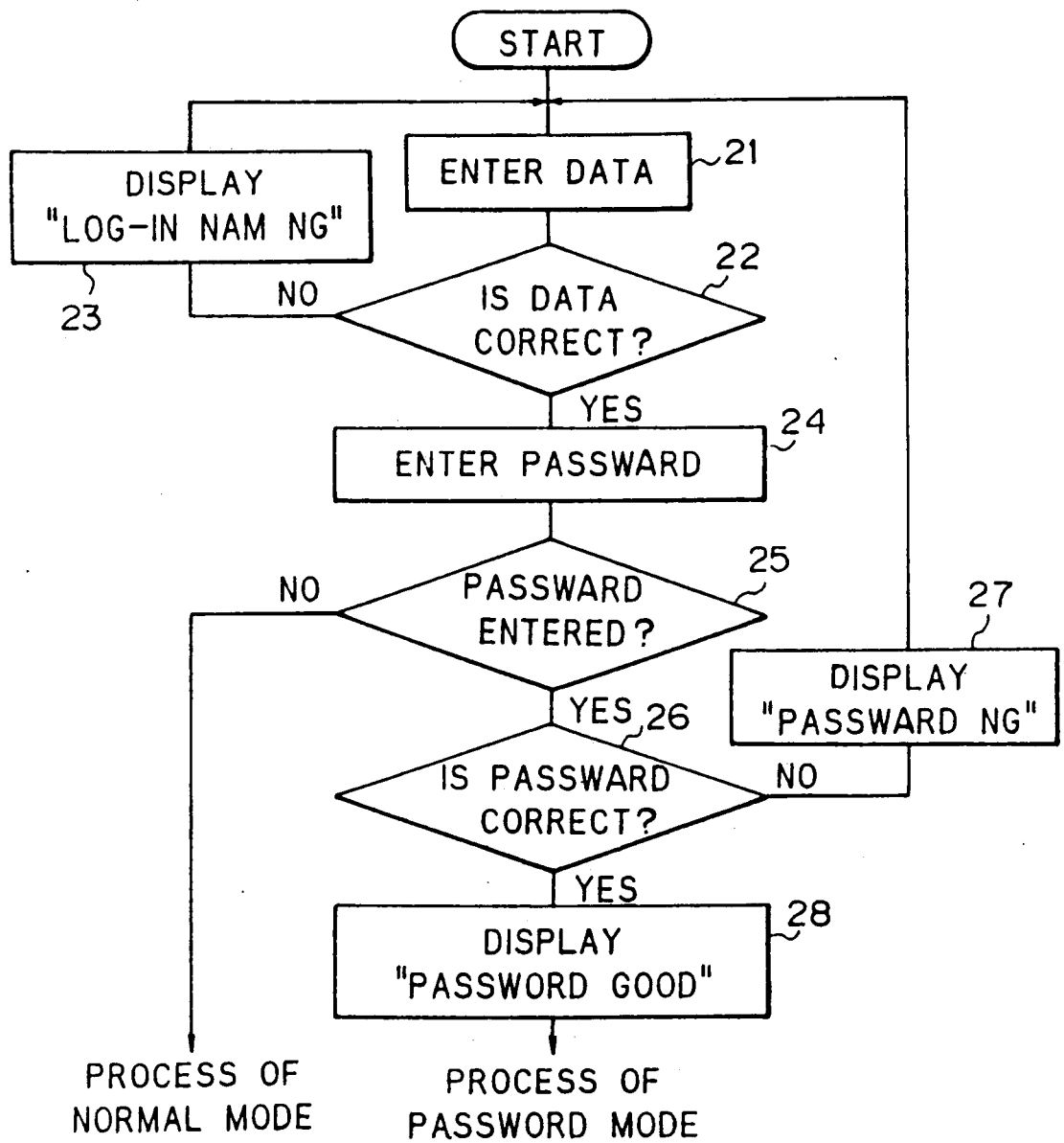
FIG. 2 is a flowchart showing a conventional password processing sequence.

FIG. 2 is a flowchart showing a conventional sequence of entering a password. When the password is correctly entered, a password mode is enabled, and when the password is not entered, a normal mode is enabled.

In the password mode, only an authorized user can perform a process with a high level of security, or secrecy. In the normal mode, any user including an unauthorized user can perform processes that are not highly secure or secret.

At the start of the sequence, a system prompts a user to enter data, and, in response to the prompt, the user operates a keyboard to enter a log-in name such as an equipment name which is publicly known (Step 21).

Then, the input data is judged for its correctness (Step 22). If it is incorrect, "LOG-IN NAME NG" is displayed (Step 23), and the user again enters the log-in name.

If it is correct, the user is prompted to enter a particular password, and, in response to the prompt, the user enters a password (Step 24). The prompt to enter a password is displayed on the display (CRT) unit. Therefore, there is a problem in that any user can know the necessity to enter a password and also know the timing when a password should be entered.

Next, an embodiment of the present invention will be described in detail.

Figure 3B:
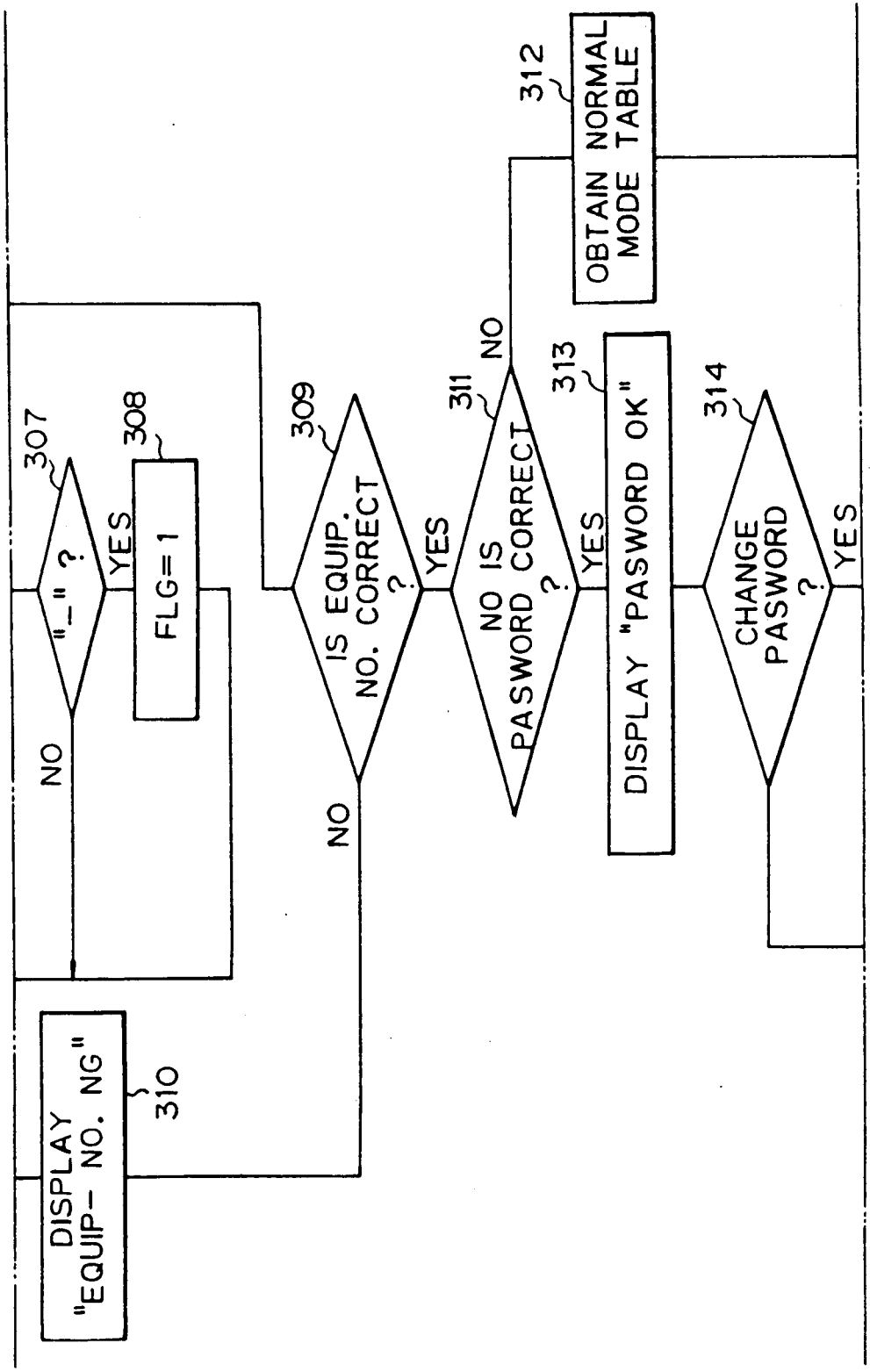

FIG. 3 is a flowchart showing a password security method according to an embodiment of the present invention. In the figure, at first, a prompt of "EQUIP" (name of equipment)=?" is displayed (Step 301). In response to the prompt, a user enters one alphanumeric or one special code which comprises one of characters of an equipment number (a log-in name), a password, or return code (Step 302). Then it is judged whether or not the return code has been entered (Step 303). If it has not been entered, it is judged whether or not a flag (FLG) is "1" (Step S304).

If the flag (FLG) is "1," it means that the special code has been entered at step 302 and that the user wants to enter a password. In this case, the system backspaces to move the cursor back by one character and an "X" is displayed at the moved to space to overwrite the previously entered character (Step 305). Thereafter, the entered alphanumeric or special code is stored in a predetermined region of a RAM (see FIG. 1) (Step 306), and a new alphanumeric or special code is entered (Step 302).

By repeating the processes from step 301 to 306 several times, the data stored at step 306 represents the equipment number (a log-in name), a password, or a return code. It should be noted that the equipment number is displayed but the password is not displayed. Also, it should be noted, at step 301, that no prompt to enter a password is displayed.

At step 304, if the flag (FLG) is not "1, " it is judged whether or not the special code (—) has been entered (Step 307). If it has not been entered, the input data is stored in the predetermined region in the RAM (Step 306), and new data is entered (Step 302). If the special code has been entered, the flag (FLG) is set to "1". (Step 308), and the input data is stored in the predetermined region in the RAM (Step 306). Thereafter, new data is entered (Step 302).

If it is judged that the return code (C/R) is entered at step 303, it is judged whether or not the entered equipment number is correct (Step 309); if it is not correct, "EQUIPMENT NUMBER NG" is displayed (Step 310), and Step 301 is again carried out.

If the equipment number is correct, it is judged whether or not the password which is stored in the RAM but is not displayed is correct (Step 311). If the stored password is wrong, a normal mode-describing table stored in the ROM is accessed (Step 312) and its contents are executed.

If the entered password is correct, the correctness is displayed (Step 313), and prompts for whether the password should be changed (Step 314), namely, whether the user wants to change the password. If it should be changed, the user enters a new password (Step 315).

The user is then asked whether or not the entered new password is correct (Step 316). If it is not correct, the user shall again enter the new password (Step 315). If the entered password is correct, a password mode-describing table is accessed (Step 317) and its contents are executed.

As explained above, according to the embodiment of the present invention, an equipment number and a password are entered sequentially, and the entered password is not displayed but instead a symbol "X" etc., is displayed until the equipment number and password are judged to be correct.

Only when the equipment number and password are correct, is the password displayed. For a user who does not know of the existence of a password or the correct password, therefore, the password is not only concealed from the user but also its existence is not perceived by the user.

According to another embodiment of the present invention, instead of displaying "X" at step 305, no symbol is displayed at the backspaced region.

According to still another embodiment of the present invention, the step 313 for displaying "PASSWORD OK" may be eliminated. This ensures the higher security or secrecy.

FIGS. 4A to 4D show display examples of a man-machine interface. A user follows the display contents and enters data by using a keyboard to set the operating conditions. During this keyboard operation, the presence and the contents of the password is kept secret to an unauthorized user, as described above.

FIG. 4A shows an example of the contents of the display in the normal mode. In FIG. 4, ① "EQNO=? C/R" is first displayed.

In response to this message, if the user enters only an equipment number (EQNO) and a return code (C/R), the normal mode is selected.

② If the equipment number entered by the user is not correct, then an equipment number, for example, "EQND=0" is displayed.

③ "EQNO=? 0 C/R" is then displayed.

This message prompts the user to enter "0" as the equipment number and then a return code.

④ "DISPL?:Y C/R" is then displayed. Namely, after a normal mode is activated according to the entered equipment number, the user is prompted to enter "Y" and the return code to enable a display (DISPL).

⑤ "DISPL:ALM?" is then displayed as an example. Namely, to select an alarm (ALM) to be displayed, the user is prompted to enter "Y C/R."

FIG. 4B shows an example of the contents of the display in the password mode. In FIG. 4B, ① "EQNO=? C/R" is first displayed in the same way as in FIG. 4A.

An authorized user is prompted by this message to enter not only an equipment number (EQNO) and a return code (C/R) but also a password.

② If the equipment number entered by the user is not correct, as an equipment number, for example, "EQNO=0" is displayed.

③ "EQNO=? 0-TEST C/R" is then displayed.

This message prompts the user to enter "0" as the equipment number, a hyphen, "TEST" as the password, and a return code. The entered characters of the password in response to the "TEST" is usually displayed as "XXXX", as mentioned in the description of the step 305 in FIG. 3.

④ If the password entered by the user is correct, the correctness is displayed as "PASSWORD OK!" as mentioned in the description of the step 313 in FIG. 3.

⑤ "CHG PASSWORD? C/R" is then displayed at the step 314.

To change the password, "Y" and a return code must be entered.

⑥ "DESPL?:Y C/R" is then displayed.

When a display (DISPL) is to be enabled in the password mode, "Y" and a return code must be entered.

⑦ "DISPL:ALM?" is then displayed.

To select an alarm (ALM) to be displayed, "Y C/R" must be entered.

FIG. 4C shows an example of the contents of the display when a wrong password is entered.

① "EQNO=? C/R" is first displayed in the same way as in FIGS. 4A and 4.

② "EQNO=0" is then displayed as in FIGS. 4A and 4B.

③ EQNO=? 0-TEST C/R is displayed as in FIG. 4B.

③ If the entered password is wrong at step 311 "DISPL?:Y C/R" is displayed and a normal mode display (DISPL) is activated by entering "Y" and a return code.

⑤ "DESPL:ALM?" is then displayed. To select an alarm (ALM) to be displayed, "Y C/R" must be entered.

FIG. 4D shows an example of the contents of the display when a wrong equipment number is entered in a normal mode. In FIG. 4D, ① "EQNO=? C/R" is first displayed as in FIGS. 4A to 4C.

② If the entered equipment number is wrong, "EQUIP NO NG!" is displayed as in step 310.

③ "EQNO=0" is then displayed as in FIGS. 4A to 4C.

If the entered equipment number is wrong again "EQUIP NO NG!" is displayed.

④ EQNO=? 0 C/R is then displayed.

This message prompts the user to enter "0" as an equipment number, and a return code.

⑤ When the entered equipment number is wrong, "EQUIP NO NG" is displayed.

⑥ "EQNO=1" is then displayed.

⑦ "EQNO=?1 CR" is then displayed.

This message prompts the user to enter the equipment number "1".

⑧ When the equipment number "1" is wrong, "EQUIP NO NG!" is again displayed.

Figure 5:
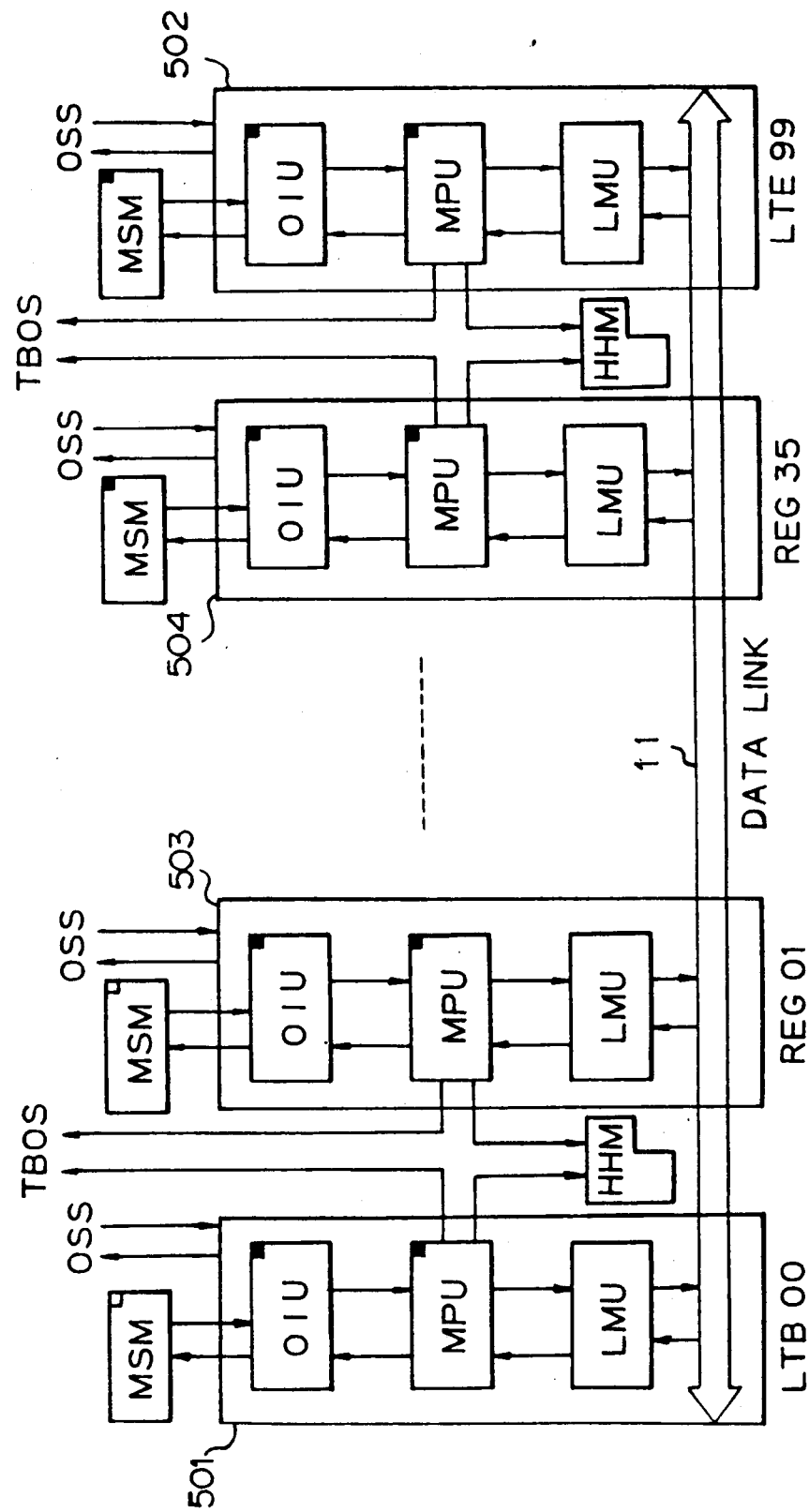
FIG. 5 is a block diagram of a practical example of a man-machine system in which the present invention is utilized.

FIG. 5 shows a transmitter system to which the present invention can be applied as an example.

In FIG. 5, a reference mark LTE00 denotes a terminal unit, and LTE99 an opposite terminal unit. Reference marks REG01 through REG35 are relay units disposed on a data link 11 connecting the terminal units LTE00 and LTE99 to each other.

The terminal units LTE00 and LTE99 and relay units REG01 through REG35 have each a microprocessor MPU for controlling an overall operation of the unit. A link monitor unit LMU is disposed between the microprocessor MPU and the data link 11 to transfer information between them. An OSS interface unit OIU transmits information with respect to an operating support system OSS that is a higher unit. A maintenance span monitor MSM monitors alarm information and status information in the terminal or relay unit.

The operating support system OSS which is a higher unit collectively monitors a plurality of data links through interfaces. A telemetry byte oriented serial TBOS is also a higher unit and collectively monitors alarm information and status information of the respective data links.

A hand-held monitor HHM monitors, sets, and displays operating conditions of the terminal or relay unit. These setting and displaying processes of the hand-held monitor HHM are carried out according to the present invention.

As explained above, according to the present invention, there is provided a man-machine system which does not let a user perceive the existence of a password. For a user who does not know of the existence of a password or the correct password, therefore, the password is not only concealed from the user but also its existence is not perceived by the user.

What is claimed is:

1. A password security method for maintaining the security of a password during a system set up process caused by accessing the system from an external source, comprising the steps of:
   (a) prompting for entry of an equipment name while no prompt to enter the password is displayed;
   (b) entering at least one of an equipment name, a special symbol, a password and a return code in response to step (a);
   (c) discriminating whether or not a correct password is entered by comparing the password entered in step (b) to a reference password previously set in the system;
   (d) executing a normal mode when the correct password is not detected; and
   (e) executing a password mode when the correct password is detected.

2. A password security method as claimed in claim 1, further comprising the steps of:
   (f) discriminating whether or not a return code has been entered;
   (g) discriminating whether or not a special code has been entered when the return code has not been entered; and
   (h) moving back a cursor by one character when one character of the password is entered.

3. A password security method as claimed in claim 2, wherein step (h) includes the sub-step of:
   (h1) displaying a predetermined fixed symbol instead of the password entered in step (b).

4. A password security method as claimed in claim 2, further comprising the steps of:
   (i) establishing a flag when the special code is detected in step (g); and
   (j) storing entered data when the special code is not detected in step (g).

5. A password security method as claimed in claim 2, further comprising the steps of:
   (i) discriminating whether or not the equipment name entered in step (b) is correct;
   (j) displaying that the equipment name is not correct when the equipment name entered in step (b) is not correct.

6. A password security method as claimed in claim 5, further comprising the step of:

(k) displaying a message when the password entered in step (b) is discriminated to be correct.

7. A password security method as claimed in claim 6, further comprising the steps of:
(l) interrogating whether or not the password should be changed; and
(m) receiving a new password when step (l) indicates that the password should be changed.

8. A password security method as claimed in claim 1, further comprising the steps of:
(f) discriminating whether or not a return code has been entered;
(g) discriminating whether or not a special code has been entered when the return code has not been entered; and
(h) moving back a cursor by one character when one character of the password is entered.

9. A password security method as claimed in claim 8, wherein step (h) includes the sub-step of:
(h1) displaying a predetermined fixed symbol instead of the password entered in step (b).

10. A password security method as claimed in claim 9, further comprising the steps of:
(i) establishing a flag when the special code is detected in step (g); and
(j) storing entered data when the special code is not detected in step (g).

11. A password security method as claimed in claim 9, further comprising the steps of:
(i) discriminating whether or not the equipment name entered in step (b) is correct;
(j) displaying that the equipment name is not correct when the equipment name entered in step (b) is not correct.

12. A password security method as claimed in claim 11, further comprising the step of:
(k) displaying a message when the password entered in step (b) is discriminated to be correct.

13. A password security method as claimed in claim 12, further comprising the steps of:
(l) interrogating whether or not the password should be changed; and
(m) receiving a new password when step (l) indicates that the password should be changed.

14. A password security method as claimed in claim 3, further comprising the steps of:
(i) establishing a flag when the special code is detected in step (g); and
(j) storing entered data when the special code is not detected in step (g).

15. A password security method as claimed in claim 3, further comprising the steps of:
(i) discriminating whether or not the equipment name entered in step (b) is correct;
(j) displaying that the equipment name is not correct when the equipment name entered in step (b) is not correct.

16. A password security method as claimed in claim 15, further comprising the step of:
(k) displaying a message when the password entered in step (b) is discriminated to be correct.

17. A password security method as claimed in claim 16, further comprising the steps of:
(l) interrogating whether or not the password should be changed; and
(m) receiving a new password when step (l) indicates that the password should be changed.

18. A password security method as claimed in claim 4, further comprising the steps of:
(k) discriminating whether or not the equipment name entered in step (b) is correct;
(l) displaying that the equipment name is not correct when the equipment name entered in step (b) is not correct.

19. A password security method as claimed in claim 18, further comprising the step of:
(m) displaying a message when the password entered in step (b) is discriminated to be correct.

20. A password security method as claimed in claim 19, further comprising the steps of:
(n) interrogating whether or not the password should be changed; and
(o) receiving a new password when step (n) indicates that the password should be changed.

* * * * *